United States Patent
Wu et al.

(10) Patent No.: US 10,936,272 B2
(45) Date of Patent: Mar. 2, 2021

(54) SPLICING SCREEN, DISPLAY METHOD THEREOF AND DISPLAY CONTROL APPARATUS

(71) Applicant: BOE TECHNOLOGY GROUP CO., LTD., Beijing (CN)

(72) Inventors: Naifu Wu, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/426,030

(22) Filed: May 30, 2019

(65) Prior Publication Data
US 2020/0057595 A1 Feb. 20, 2020

(30) Foreign Application Priority Data
Aug. 15, 2018 (CN) .......................... 201810930315.4

(51) Int. Cl.
G06F 3/14 (2006.01)
G09G 5/00 (2006.01)
G09G 5/12 (2006.01)
G09G 5/373 (2006.01)

(52) U.S. Cl.
CPC .......... *G06F 3/1446* (2013.01); *G09G 5/006* (2013.01); *G09G 5/12* (2013.01); *G09G 5/373* (2013.01); *G09G 2356/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,403,237 | B2* | 9/2019 | Chen | G09G 5/14 |
| 2013/0241954 | A1* | 9/2013 | Yu | G06F 3/1446 345/629 |
| 2014/0184472 | A1* | 7/2014 | Xia | G06F 3/1446 345/1.3 |
| 2015/0294640 | A1* | 10/2015 | Lei | H04N 5/14 348/445 |
| 2016/0078840 | A1* | 3/2016 | Kusaka | G06F 3/1438 345/173 |
| 2016/0291919 | A1* | 10/2016 | Kurota | H04N 5/64 |
| 2016/0313962 | A1* | 10/2016 | Kwon | G06F 3/04886 |
| 2017/0192733 | A1* | 7/2017 | Huang | G06F 3/1446 |
| 2017/0278485 | A1* | 9/2017 | Chen | G06F 3/14 |
| 2018/0088888 | A1* | 3/2018 | Ma | G09G 5/005 |
| 2018/0088889 | A1* | 3/2018 | Chang | H04N 13/282 |

* cited by examiner

*Primary Examiner* — Motilewa Good Johnson
(74) *Attorney, Agent, or Firm* — Leason Ellis LLP

(57) ABSTRACT

A splicing screen, a display method for a splicing screen and a display control apparatus are provided. The display method for a splicing screen includes: acquiring physical coordinates of a plurality of display screens constituting a splicing screen; adjusting a size of an image to be displayed to be equal to a size of a virtual display screen after the plurality of display screens are spliced, and acquiring a resolution of the image; respectively calculating pixel coordinates of each of the display screens according to the physical coordinates of the plurality of display screens and the resolution of the image; and distributing pixel data to each of the display screens according to the pixel coordinates of each of the display screens.

16 Claims, 5 Drawing Sheets

SPLICING SCREEN, DISPLAY METHOD THEREOF AND DISPLAY CONTROL APPARATUS

CROSS-REFERENCE TO RELATED APPLICATION

The present application claims priority of the Chinese Patent Application No. 201810930315.4, filed on Aug. 15, 2018, the disclosure of which is incorporated herein by reference in its entirety as part of the present application.

TECHNICAL FIELD

The present disclosure relates to the field of display technology, and in particular, to a splicing screen, a display method for a splicing screen and a display control apparatus.

BACKGROUND

A splicing screen is composed of plurality of display screens into a complete display unit, which has been widely used in various industries, such as stations, monitoring rooms, shopping malls and the like.

At present, display screens of the same size are generally spliced when a splicing screen is applied. However, in practical applications, it is often necessary to splice display screens of different sizes, different shapes, and different resolutions. In this case, there are problems to be solved that images displayed in respective display screens do not match, and dragging images to move between displays cannot be smoothly performed.

SUMMARY

In one aspect, an embodiment of the present disclosure provides a display method for a splicing screen, including: acquiring physical coordinates of a plurality of display screens constituting a splicing screen; adjusting a size of an image to be displayed to be equal to a size of a virtual display screen after the plurality of display screens are spliced, and acquiring a resolution of the image; respectively calculating pixel coordinates of each of the display screens according to the physical coordinates of the plurality of display screens and the resolution of the image; and distributing pixel data to each of the display screens according to the pixel coordinates of each of the display screens.

In one embodiment, acquiring physical coordinates of a plurality of display screens constituting a splicing screen includes: acquiring splicing positions of the plurality of display screens constituting the splicing screen; acquiring a physical size of each of the display screens; defining a reference origin of the splicing screen; and calculating physical coordinates of each of the display screens relative to the reference origin according to the physical size of each of the display screens and the splicing positions of the plurality of display screens.

In one embodiment, calculating physical coordinates of each of the display screens relative to the reference origin according to the physical size of each of the display screens and the splicing positions of the plurality of display screens includes: calculating physical coordinates of any set of diagonal points in each of the display screens relative to the reference origin according to the physical size of each of the display screens and the splicing positions of the plurality of display screens.

In one embodiment, respectively calculating pixel coordinates of each of the display screens according to the physical coordinates of the plurality of display screens and the resolution of the image includes: respectively calculating pixel coordinates of one of the diagonal points in each of the display screens according to the physical coordinates of the diagonal points in the plurality of display screens with respect to the physical coordinates of the reference origin and the resolution of the image.

In one embodiment, distributing pixel data to each of the display screens according to the pixel coordinates of each of the display screens includes: acquiring a size of a pixel area of each of the display screens; and distributing pixel data to each of the display screens according to the pixel coordinates of one of the diagonal points in each of the display screens and the size of the pixel area.

In one embodiment, defining the reference origin of the splicing screen as the lower left corner of the virtual display after the plurality of display screens are spliced. Respectively calculating pixel coordinates of each of the display screens according to the physical coordinates of the plurality of display screens and the resolution of the image includes: calculating the pixel coordinates of the display screen according to $$\left(\frac{x_2}{x_2} \cdot j, \frac{y_2 - y_1}{y_2} \cdot k\right),$$

where $(x_1, y_1)$ is the physical coordinates of the display screen, and $(x_2, y_2)$ is the physical coordinates of the upper right corner of the virtual display screen after the plurality of display screens are stitched, and $j \cdot k$ is the resolution of the image.

In another aspect, an embodiment of the present disclosure provides a display control apparatus for a splicing screen, including: an acquiring unit configured to acquire physical coordinates of a plurality of display screens constituting a splicing screen; an adjusting unit configured to calculate a size of an image to be displayed that is equal to a size of a virtual display screen after the plurality of display screens are spliced, and acquire a resolution of the image; a calculating unit configured to respectively calculate pixel coordinates of each of the display screens according to the physical coordinates of the plurality of display screens acquired by the acquiring unit and the resolution of the image acquired by the acquiring unit; and a transmitting unit configured to distribute pixel data to each of the display screens according to the pixel coordinates of each of the display screens acquired by the calculating unit.

In one embodiment, the acquiring unit includes: a first acquiring module configured to acquire splicing positions of the plurality of display screens constituting the splicing screen; a second acquiring module configured to acquire a physical size of each of the display screens; a coordinate module configured to define a reference origin of the splicing screen; a first calculating module configured to calculate physical coordinates of each of the display screens relative to the reference origin according to the physical size of each of the display screens acquired by the second acquiring module and the splicing positions of the plurality of display screens acquired by the first acquiring module.

In one embodiment, the first calculating module is configured to calculate physical coordinates of any set of diagonal points in each of the display screens relative to the reference origin according to the physical size of each of the display screens and the splicing positions of the plurality of display screens.

In one embodiment, the calculating unit is configured to respectively calculate pixel coordinates of one of the diagonal points in each of the display screens according to the physical coordinates of the diagonal points in the plurality of display screens with respect to the physical coordinates of the reference origin and the resolution of the image.

In one embodiment, the transmitting unit includes: a third acquiring module configured to acquire a size of a pixel area of each of the display screens; and a transmitting module configured to distribute pixel data to each of the display screens according to the pixel coordinates of one of the diagonal points in each of the display screens and the size of the pixel area.

In one embodiment, the coordinate module is configured to define the reference origin of the splicing screen as the lower left corner of the virtual display after the plurality of display screens are spliced; the calculating unit is configured to calculate the pixel coordinates of the display screen according to $$\left(\frac{x_1}{x_2} \cdot j, \frac{y_2 - y_1}{y_2} \cdot k\right),$$

where $(x_1, y_1)$ is the physical coordinates of the display screen, and $(x_2, y_2)$ is the physical coordinates of the upper right corner of the virtual display screen after the plurality of display screens are stitched, and $j \cdot k$ is the resolution of the image.

In another aspect, an embodiment of the present disclosure provides a controller, including: a memory and at least one processor coupled to the processor, wherein the processor is configured to execute program instructions stored in the memory, when being executed, the program instructions perform the display method for a splicing screen described above.

In another aspect, an embodiment of the present disclosure provides a storage medium, wherein the storage medium includes a stored program, wherein when being executed, the program controls the device in which the storage medium is located is controlled to perform the display method for a splicing screen described above.

In another aspect, an embodiment of the present disclosure provides a splicing screen including a plurality of display screens spliced to one another, further including: the controller described above; wherein each of the display screens includes a splicing edge, wherein the splicing edge is an edge of the display screen in contact with the display screen adjacent thereto; a sensor is disposed on the splicing edge of each of the display screens, and the sensor is configured to detect position information of the display screen and transmit the position information to the controller.

BRIEF DESCRIPTION OF THE DRAWINGS

In order to more clearly illustrate the technical solutions of the embodiments of the present disclosure, the drawings of the embodiments will be briefly described below. Apparently, the drawings in the following description relate only to some embodiments of the present disclosure, and are not to limit the present disclosure.

DETAILED DESCRIPTION

In order to make the objectives, technical solutions and advantages of the present disclosure more clear, the embodiments of the present disclosure will be described in detail below with reference to the accompanying drawings. It should be noted that, the features in the embodiments and the embodiments in the present application may be arbitrarily combined with each other without conflict.

The steps illustrated in the flowchart of the figures may be executed in a computer system such as a set of computer executable instructions. Also, although logical sequences are shown in the flowcharts, in some cases the steps shown or described may be performed in a different order than those described herein.

Unless otherwise defined, the terms "first", "second", and similar terms used in the embodiments of the present disclosure do not denote any order, quantity, or importance, but are merely used to distinguish different components. The words "including" or "comprising", and the like, means that an element or an item before the word covers an element or an item and its equivalent listed after the word, without excluding other element or item. The words "coupling" or "connecting" and the like are not limited to physical or mechanical connections, but may include electrical connections, whether direct or indirect.

As used herein, "a plurality of" or "multiple" means two or more, in other words, more than one.

Figure 1:
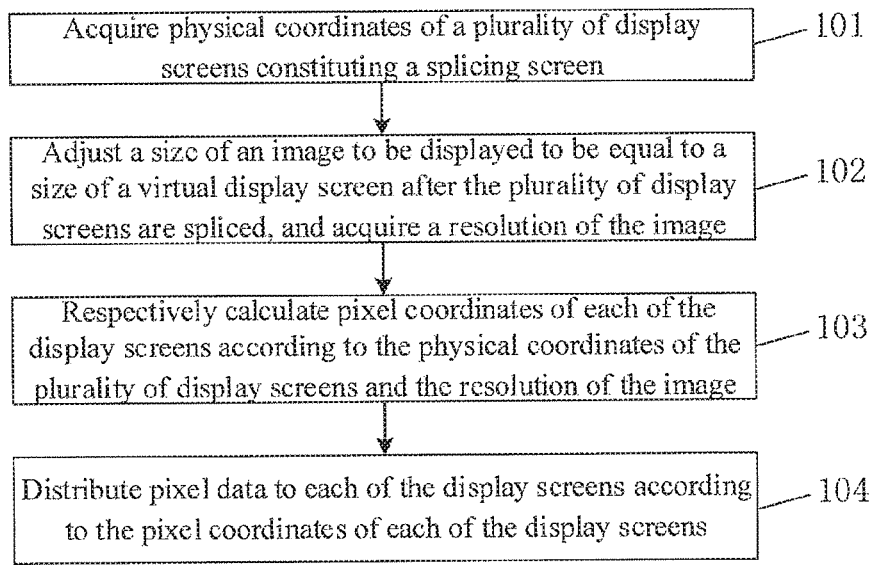
FIG. 1 is a flowchart of a display method for a splicing screen according to an embodiment of the present disclosure.

As shown in FIG. 1, an embodiment of the present disclosure provides a display method for a splicing screen, which may include the following steps.

In step 101, physical coordinates of a plurality of display screens constituting a splicing screen are acquired.

When a plurality of display screens are spliced together to form a splicing screen, for different sizes of display screens to be spliced together, it is necessary to acquire splicing positions of the display screens, and determine which part of an image is displayed on a display screen according to the splicing position of the display screen. After acquiring the splicing positions of the display screens, the physical coordinates of the display screens are acquired according to the splicing positions. The acquisition method can be detecting the coordinate positions of the splicing of the display screens through sensors disposed on edges of the display screens where the display screens are spliced together. The sensors send the detected coordinate positions to the controller, such as a Microcontroller Unit (MCU), with a data transmission mode of wired transmission or wireless transmission such as Bluetooth, WIFI, and the like. Then, physical coordinates of any point on the display screens can be calculated according to the physical sizes of the display screens.

Figure 2:
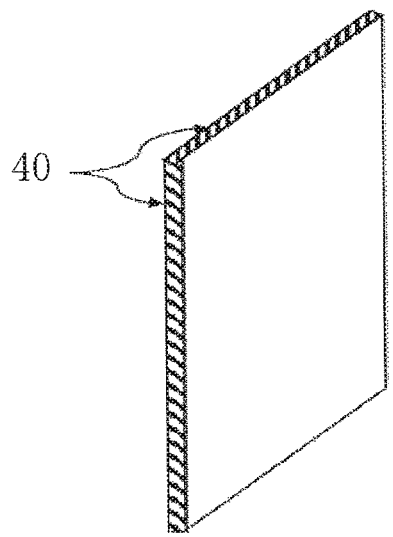
FIG. 2 is a schematic structural diagram of a display screen according to an embodiment of the present disclosure.
Figure 3:
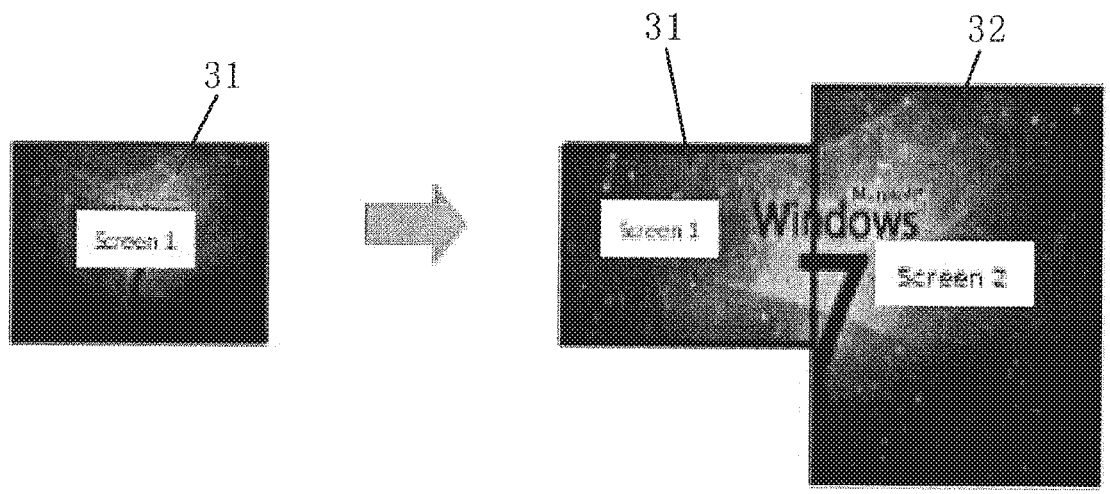
FIG. 3 is a diagram of a displayed image after the display screens are spliced according to an embodiment of the present disclosure.

For example, as shown in FIG. 2 and FIG. 3, a first display screen 31 and a second display screen 32 of different sizes are spliced to each other, and on a splicing edge of the first display screen 31 and a splicing edge of the second display screen 32 are disposed sensors 40. The sensors 40 detect coordinate positions when the first display screen 31 is in contact with the second display screen 32. The coordinate positions can be acquired from the sensors 40 by a controller (such as an MCU), and the physical sizes of the first display screen 31 and the second display screen 32 can be acquired, thereby physical coordinates of any point of the first display screen 31 and the second display screen 32 can be acquired. Alternatively, the physical coordinates of the display screens can also be acquired by a machine vision system capturing a physical image of the display screens after being spliced, acquiring position information of the display screens through image processing, and then sending the position information to the controller to complete acquisition of the physical coordinates of the display screens. The manner of acquiring the physical coordinates of the display screens can be various, which is not limited herein. It should be noted that, in the above two acquisition methods, the method of providing sensors has the advantages of simple design and low cost compared with the method of adopting a machine vision system.

In step 102, a size of an image to be displayed is made to be equal to a size of a virtual display screen after the plurality of display screens are spliced, and a resolution of the image is acquired.

The virtual display here refers to a splicing screen obtained by splicing a plurality of display screens as a single display screen. In some embodiments, a length and a width of the virtual display screen are calculated based on the length, the width, and the position of the effective display area of each screen. In other embodiments, the length and the width of the virtual display may include effective display areas and borders of the screens. The size of the border can be acquired by a position sensor or input by a user. In order to achieve different display effects, the user can select the virtual display screen to include only the effective display area, or include the effective display area and the border, and even include the interval area between the respective displays, which is not limited herein.

In order to adjust the length and the width of the image to be displayed to be equal respectively to the length and the width of the virtual display screen after these display screens are spliced, it may be necessary to change the resolution of the image accordingly. In an example of FIG. 3, the virtual display screen only includes the effective display area of each screen. For the sake of brevity, the display screen hereinafter refers to the effective display area of the display screen, which will not be noted below. As shown in FIG. 3, the original image is displayed in the first display screen 31. After the first display screen 31 and the second display screen 32 are spliced, the original image needs to be enlarged, so that the length of the enlarged image is equal to the length of the virtual display screen after the first display screen 31 and the second display screen 32 are spliced, and the width of the enlarged image is equal to the width of the virtual display screen. In the example of the horizontal splicing shown in FIG. 3, the length of the virtual display screen is the sum of the lengths of the first display screen 31 and the second display screen 32, and the width of the virtual display screen is the width of the second display screen 32. That is, the width of the virtual display screen is equal to the width of the widest screen. It is easy to understand that in the case of vertical splicing, the length of the virtual screen is the length of the longest screen, and the width of the virtual screen is the sum of the widths of all of the screens. Then, the resolution of the image to be displayed is recalculated based on the length and width of the virtual display screen. Calculating the image resolution based on the length and width dimensions can be performed using any method commonly used in the art, which will not be described herein. In the example of FIG. 3, the resolution of the enlarged image is $(h_1+h_2) \cdot v_2$, wherein the resolution of the first display screen is $h_1 \cdot v_1$, and the resolution of the second display screen is $h_2 \cdot v_2$.

In step 103, pixel coordinates of each of the display screens are calculated respectively according to the physical coordinates of the plurality of display screens and the resolution of the image.

Figure 4:
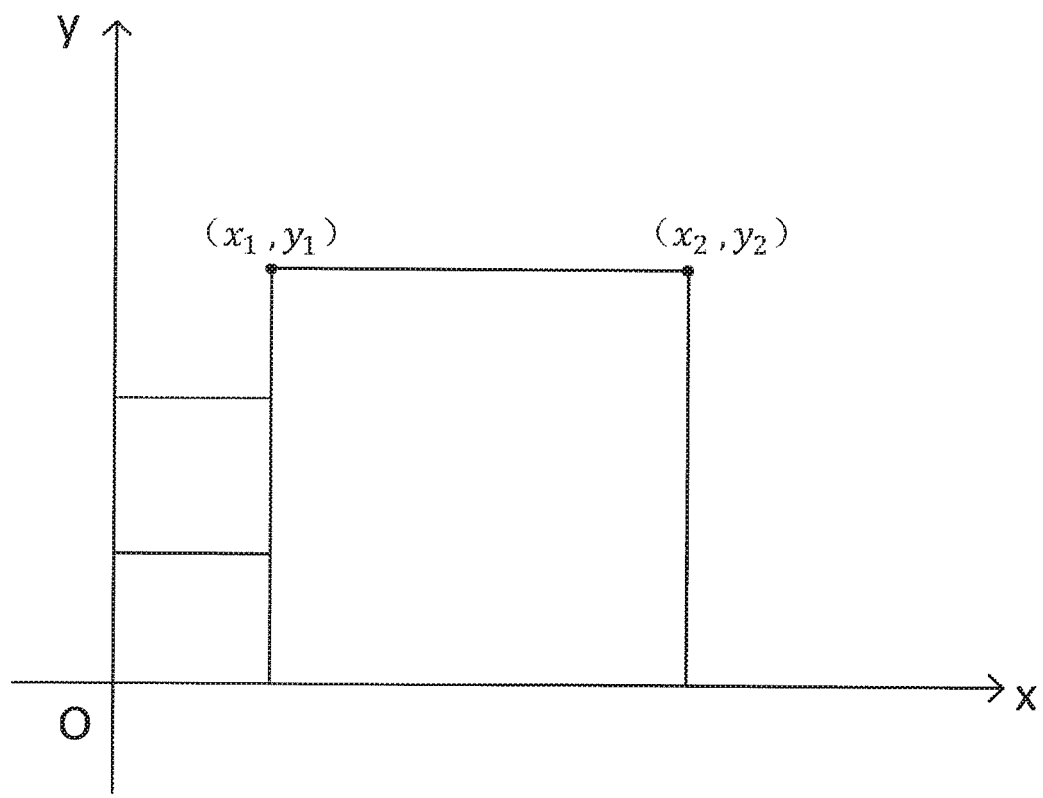
FIG. 4 is a diagram showing coordinates of display screens after being spliced according to an embodiment of the present disclosure.

The pixel coordinates corresponding to the physical coordinates of any point on the display screen can be calculated as follows. As shown in FIG. 4, for the convenience of calculation, the reference origin o of the physical coordinates is defined in the lower left corner of the virtual display after the display screens are spliced, and the pixel coordinates of any point on the display screen can be calculated according to $$\left( \frac{x_1}{x_2} \cdot j, \frac{y_2 - y_1}{y_2} \cdot k \right),$$

where $(x_1, y_1)$ is a physical coordinate of a point on the display screen, which can be acquired at step 101; $(x_2, y_2)$ is a physical coordinate of the upper right corner of the virtual display after the display screens are spliced, that is, $x_2$ is equal to the length of the virtual display after the display screens are spliced, and $y_2$ is equal to the width of the virtual display after the display screens are spliced; and $j \cdot k$ is a resolution of the image, which can be acquired at step 102. It should be noted that in the description of step 102, $h_1+h_2=j$ and $v_2=k$.

In step 104, pixel data is distributed to each of the display screens according to the pixel coordinates of each of the display screens.

When the pixel coordinates of any point on the display screen are obtained, the pixel data of the image to be displayed at the point of the display screen can be known. It should be noted that, after the display screens of different sizes are spliced, the effective display area of the actual screen obtained from the splicing will have a vacant part compared with the virtual display screen, and the vacant part will not have pixel data transmitted. That is, the part of the image which should be originally displayed in the vacant part will not be displayed. Pixel data of parts of the image are sent to corresponding parts of the display screen. Exemplary screen display is as shown in FIG. 3.

In practical applications, it is generally necessary to synchronize these displays before distributing pixel data to each display. In one embodiment, this can be accomplished by transmitting a synchronization signal. In addition, screen synchronization can also be achieved by hardware, for example, by using a graphics card, a sync card, or the like.

Although the display method for a splicing screen according to the present disclosure has been described above with reference to FIG. 3 as an example of horizontally splicing two screens, the present disclosure is not limited thereto. In other embodiments, two or more screens may be spliced longitudinally or in any desired direction, and the screens spliced may be in regular or irregular shapes, and the shapes and sizes of the screens may be the same or different. It should be noted that when screens of different sizes and different shapes are spliced, the display area of the actual screen obtained from splicing may have vacant part compared with the virtual display screen. That is, at positions corresponding some parts of the image there is no display screen. In this case, the method of the present disclosure does not transmit the data of the part of the image that should otherwise be displayed in the vacant part, and the part of the image corresponding to the vacant part is not displayed, while only pixel data of the image corresponding to the part where there are display screen is transmitted. This situation may be applicable to application scenarios such as for displaying company logo and product external appearance.

In the display method for a splicing screen provided by the embodiment of the present disclosure, physical coordinates of a plurality of display screens constituting the splicing screen are acquired, a length and a width of an image to be displayed is made to be equal to a length and a width of the virtual display screen, and a resolution of the image is acquired based on the length and the width of the virtual display screen, such that pixel coordinates of each of the display screens are calculated respectively according to the physical coordinates of the plurality of display screens and the resolution of the image, and then pixel data is distributed to each of the display screens according to the pixel coordinates of each of the display screens, so as to achieve the splicing screen for displaying the image. In the embodiment of the present disclosure, for a splicing screen composed of display screens of different sizes, the image displayed on the splicing screen is achieved by acquiring a size of an image on the virtual display screen according to pixel coordinates of the display screens after the display screens are spliced, calculating resolution of the image again according to the size of the image on the virtual display screen, and respectively calculating pixel coordinates of each of the display screens based on the physical coordinates of each of the display screens and the calculated common resolution of the image, so that corresponding pixel data is displayed on each screen. Therefore, when displaying an image on the splicing screen, the parts of the image on the display screens are consistent, and when the displayed image is moved, the switching effect between the screens can be smooth.

Figure 5:
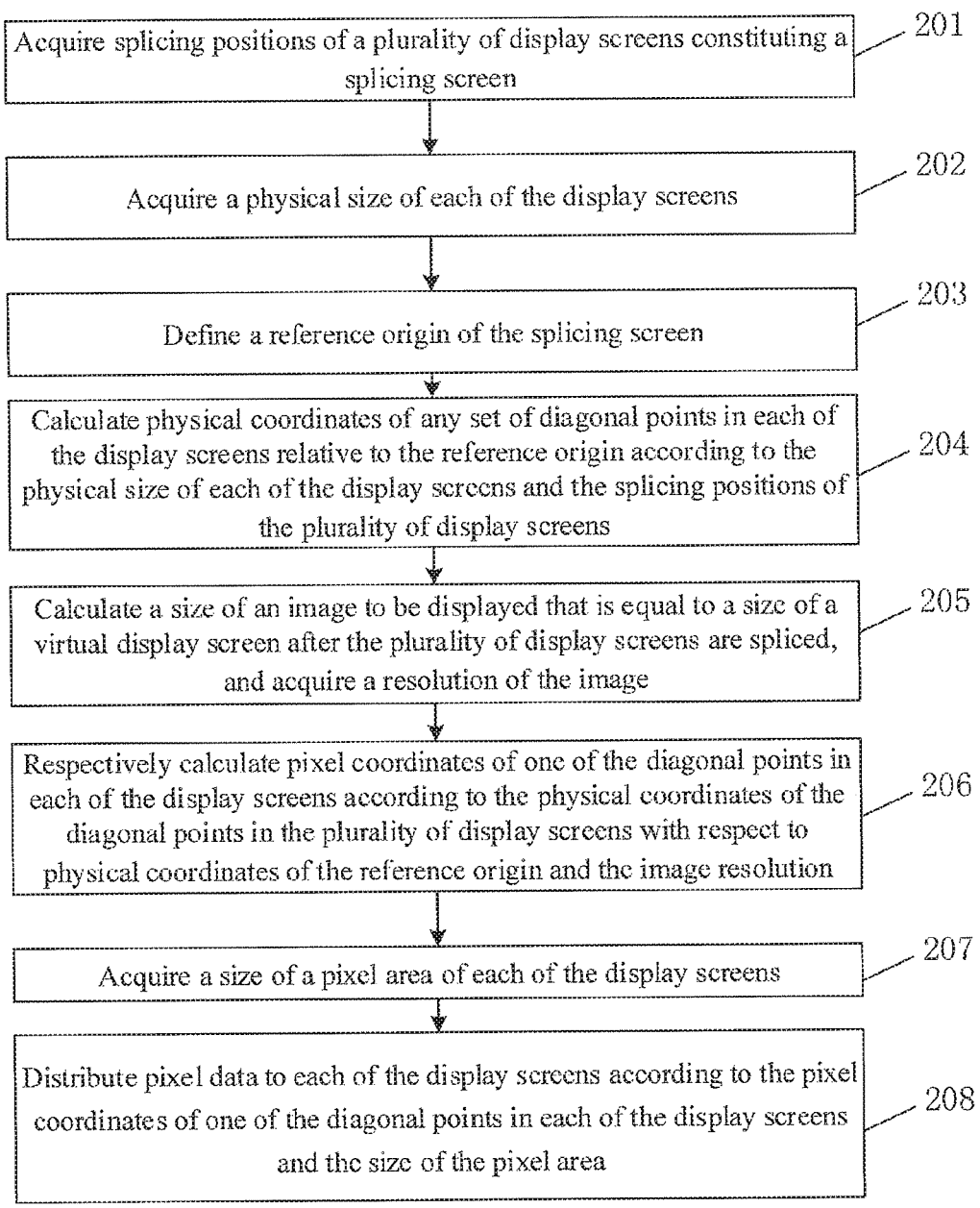
FIG. 5 is a flowchart of another display method for a splicing screen according to an embodiment of the present disclosure.

As shown in FIG. 5, an embodiment of the present disclosure further provides a display method for a splicing screen, including the following steps.

In step 201, splicing positions of a plurality of display screens constituting a splicing screen are acquired.

For a specific implementation of acquiring the splicing positions of the display screens, reference can be made to the corresponding description in step 101 of FIG. 1, which will not be described herein.

In step 202, a physical size of each of the display screens is acquired.

Figure 6:
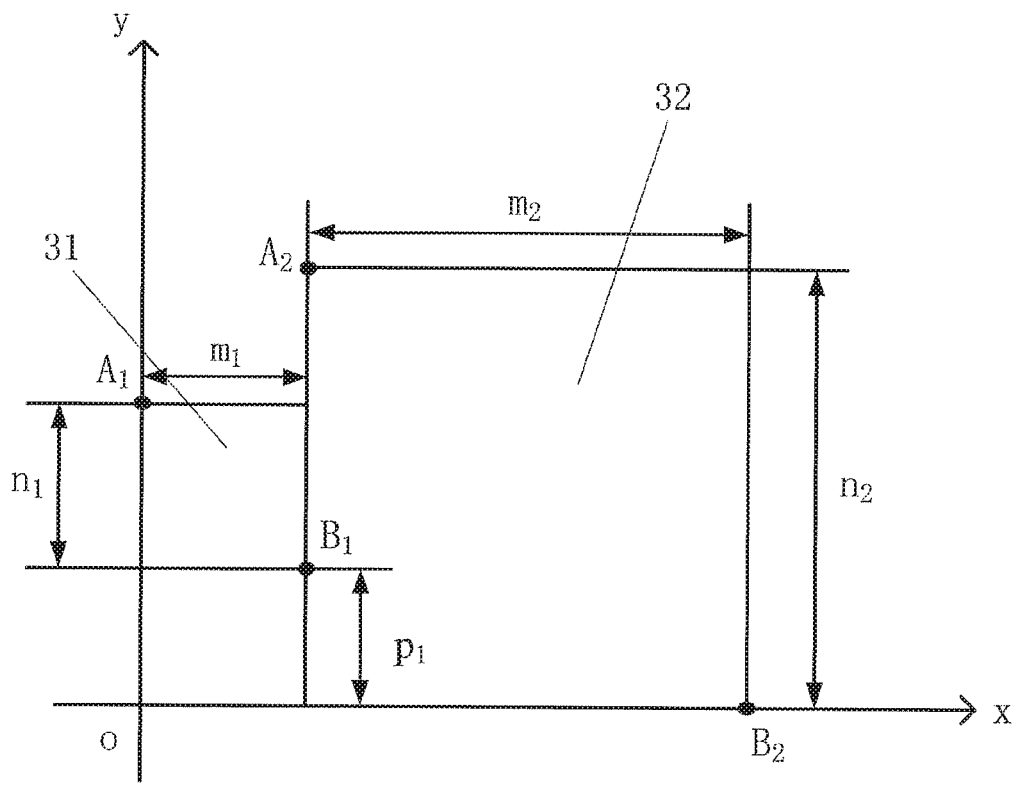
FIG. 6 is a another diagram showing coordinates of display screens after being spliced according to an embodiment of the present disclosure.

As an example, a sensor may be disposed on the periphery of the display screen. When the display screen is spliced, the sensor sends parameters such as the physical size of the display screen and the resolution of each of the display screens to the controller (such as an MCU). In FIG. 6, taking coordinates of the first display screen 31 and the second display screen 32 after being spliced as an example, the physical size of the first display screen 31 is $m_1 \cdot n_1$, and the physical size of the second display screen 32 is $m_2 \cdot n_2$.

In step 203, a reference origin of the splicing screen is defined.

For the convenience of calculation, the reference origin of the splicing screen is defined as the lower left corner of the virtual display after the plurality of display screens are spliced, and then step 204 is performed.

In step 204, physical coordinates of any set of diagonal points in each of the display screens relative to the reference origin are calculated according to the physical size of each of the display screens and the splicing positions of the plurality of display screens.

As shown in FIG. 6, the physical coordinates of the points $A_1$ and $B_1$ of the first display screen 31 and the physical coordinates of the points $A_2$ and $B_2$ of the second display screen are respectively calculated. When sensors are disposed on the periphery of the first display screen 31 and the second display screen 32, the sensors can detect the coordinate positions when the first display screen 31 is in contact with the second display screen 32. It can be obtained $A_1(0, p_1+n_1)$, $B_1(m_1, p_1)$, $A_2(m_1, n_2)$, $B_2(m_1+m_2, 0)$, if a vertical distance of the point $B_1$ relative to the x-axis is $p_1$.

In step 205, a size of an image to be displayed is made to be equal to a size of a virtual display screen after the plurality of display screens are spliced, and a resolution of the image is acquired.

As shown in FIG. 6, the image size is adjusted to the size of the virtual display screen after the first display screen 31 and the second display screen 32 are spliced, that is, the image size is $(m_1+m_2)*n_2$, when the resolution of the first display screen is $h_1*v_1$, and when the resolution of the second display is $h_2*v_2$, where $v_2$ is greater than $v_1$. The resolution of the virtual display can be $(h_1+h_2)*v_2$, and the resolution of the image is correspondingly $(h_1+h_2)*v_2$. However, the resolution of the virtual display screen may be equal to $(h_1+h_2)*v_1$ according to actual needs, and the disclosure does not limit this.

In step 206, pixel coordinates of one of the diagonal points in each of the display screens are respectively calculated according to the physical coordinates of the diagonal points in the plurality of display screens with respect to the physical coordinates of the reference origin and the resolution of the image.

As shown in FIG. 6, the pixel coordinates of the point $A_1$ of the first display screen 31 are calculated as $$\left(0, \frac{n_2 - n_1 - p_1}{n_2} \cdot v_2\right),$$

and the pixel coordinates of the point $A_2$ of the second display screen 32 are calculated as $$\left(\frac{m_1}{m_1 + m_2} \cdot (h_1 + h_2), 0\right).$$

In step 207, a size of a pixel area of each of the display screens is acquired.

As shown in FIG. 6, when the resolution of the first display screen 31 is $h_1*v_1$, and the resolution of the second display is $h_2*v_2$, the size of the pixel area of the first display screen 31 is $h_1*v_1$, and the size of the pixel area of the second display screen 32 is $h_2*v_2$.

In step 208, pixel data is distributed to each of the display screens according to the pixel coordinates of one of the diagonal points in each of the display screens and the size of the pixel area.

As shown in FIG. 6, the point $A_1$ of the first display screen 31 serves as the starting point of the first display screen 31, and after acquiring the pixel coordinates of the starting point $A_1$ and the size of the pixel area of the first display screen 31, pixel data of the image of the corresponding area can be transmitted to the first display screen 31. Similarly, the point $A_2$ of the second display screen 32 serves as the starting point of the second display screen 32, and after acquiring the pixel coordinates of the starting point $A_2$ and the size of the pixel area of the second display screen 32, pixel data of the image of the corresponding area can be transmitted to the second display screen 32. Eventually, the splicing screen constituted by the first display screen 31 and the second display screen 32 displays the image, and the part of the image corresponding to the vacant part after the first display screen 31 and the second display screen 32 are spliced, is not displayed.

In the display method for a splicing screen provided by the embodiment of the present disclosure, when the display screens of different sizes or different shapes are spliced to form a splicing screen, the part of the image corresponding to the vacant part of the splicing screen is not displayed, and the part where there are display screens the image is displayed according to the pixel coordinates, such that the image displayed in each of the display screens is matched. This situation may be applicable to application scenarios such as for displaying company logo and product external appearance.

Figure 7:
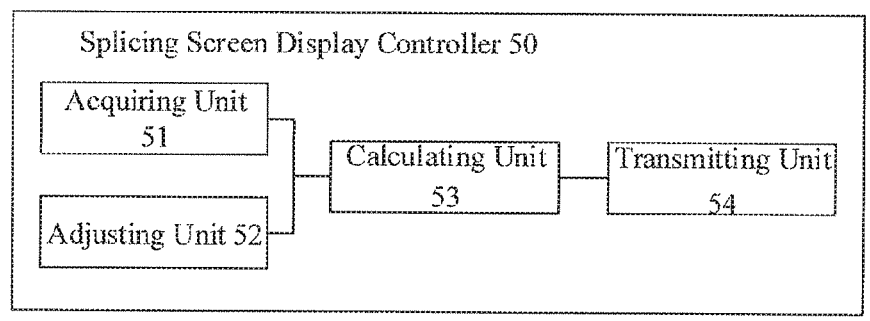
FIG. 7 is a schematic block diagram of a display control apparatus of a splicing screen according to an embodiment of the present disclosure.

As shown in FIG. 7, an embodiment of the present disclosure provides a display control apparatus 50 for a splicing screen, including: an acquiring unit 51, an adjusting unit 52, a calculating unit 53, and a transmitting unit 54.

The acquiring unit 51 is configured to acquire physical coordinates of a plurality of display screens constituting a splicing screen.

The adjusting unit 52 is configured to adjust a size of an image to be displayed to be equal to a size of a virtual display screen after the plurality of display screens are spliced, and acquire a resolution of the image.

The calculating unit 53 is configured to respectively calculate pixel coordinates of each of the display screens according to the physical coordinates of the plurality of display screens acquired by the acquiring unit 51 and the resolution of the image acquired by the acquiring unit 51.

The transmitting unit 54 is configured to distribute pixel data to each of the display screens according to the pixel coordinates of each of the display screens acquired by the calculating unit 53.

Figure 8:
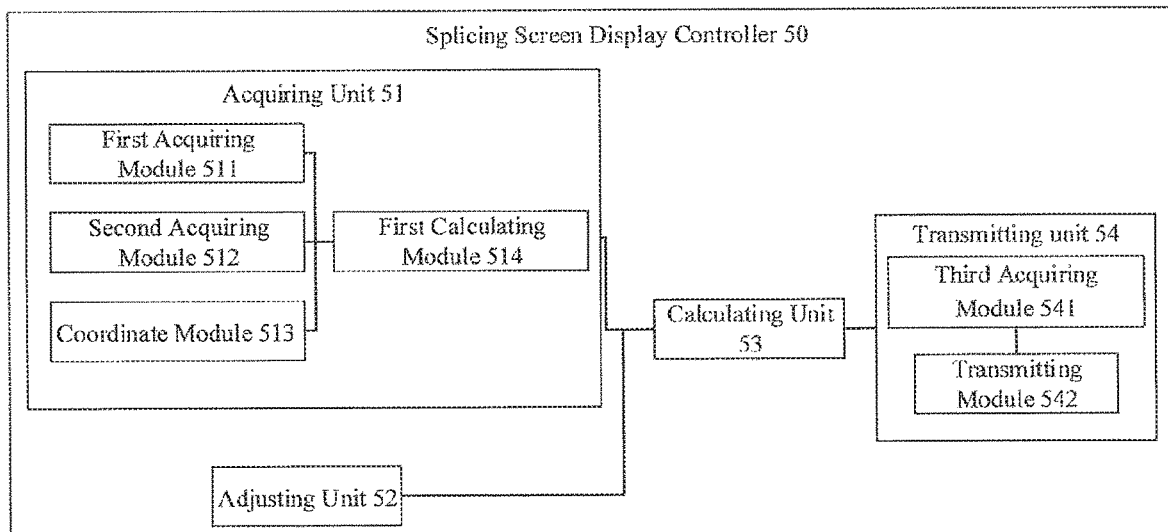
FIG. 8 is a schematic block diagram of another display control apparatus of a splicing screen according to an embodiment of the present disclosure.

As shown in FIG. 8, the acquiring unit 51 may include: a first acquiring module 511, a second acquiring module 512, a coordinate module 513, and a first calculating module 514.

The first acquiring module 511 is configured to acquire splicing positions of the plurality of display screens constituting the splicing screen.

The second acquiring module 512 is configured to acquire a physical size of each of the display screens.

The coordinate module 513 is configured to define a reference origin of the splicing screen.

The coordinate module 514 is configured to calculate physical coordinates of each of the display screens relative to the reference origin according to the physical size of each of the display screens acquired by the second acquiring module 512 and the splicing positions of the plurality of display screens acquired by the first acquiring module 511.

The first calculating module 514 may be configured to calculate physical coordinates of any set of diagonal points in each of the display screens relative to the reference origin according to the physical size of each of the display screens and the splicing positions of the plurality of display screens.

The calculating unit 53 may be configured to respectively calculate pixel coordinates of one of the diagonal points in each of the display screens according to the physical coordinates of the diagonal points in the plurality of display screens with respect to the physical coordinates of the reference origin and the resolution of the image.

In one embodiment, the transmitting unit 54 may include a third acquiring module 541 and a transmitting module 542.

The third acquiring module 541 is configured to acquire a size of a pixel area of each of the display screens.

The transmitting module 542 is configured to distribute pixel data to each of the display screens according to the pixel coordinates of one of the diagonal points in each of the display screens and the size of the pixel area.

The coordinate module 513 can be configured to define the reference origin of the splicing screen as the lower left corner of the virtual display after the plurality of display screens are spliced.

The calculating unit 53 calculates the pixel coordinates of the display screen according to $$\left(\frac{x_1}{x_2} \cdot j, \frac{y_2 - y_1}{y_2} \cdot k\right),$$

where $(x_1, y_1)$ is the physical coordinates of the display screen, and $(x_2, y_2)$ is the physical coordinates of the upper right corner of the virtual display screen after the plurality of display screens are stitched, and $j \cdot k$ is the resolution of the image.

It should be noted that the display control apparatus for the splicing screen provided by the embodiment of the present disclosure may be configured to execute the display method for the splicing screen provided by the corresponding embodiment of the present disclosure, and the implementation details may refer to the corresponding methods shown in FIG. 1 and FIG. 5, which will not be repeated here. However, it should be clarified that the display control apparatus for the splicing screen of the embodiment can implement all the contents in the foregoing method embodiments.

In the display control apparatus for the splicing screen provided by the embodiment of the present disclosure, physical coordinates of a plurality of display screens constituting the splicing screen are acquired, a length and a width of an image to be displayed is made to be equal to a length and a width of the virtual display screen obtained from the splicing, and a resolution of the image is acquired, such that pixel coordinates of each display screen are calculated respectively according to the physical coordinates of the plurality of display screens and the resolution of the image, and then pixel data is distributed to each display screen according to the pixel coordinates of each display screen, so as to achieve the splicing screen for displaying the image. For a splicing screen composed of display screens of different sizes, since the image displayed on the display screen is achieved by acquiring corresponding pixel data according to pixel coordinates of the display screens after the display screens are spliced, when displaying an image on the splicing screen, the parts of the image on the display screens are matched.

An embodiment of the present disclosure provides a controller, including: a memory and at least one processor. The memory is coupled to the processor, and the processor is configured to execute program instructions stored in the memory, and the program instructions when being executed, perform the display method for the splicing screen as described above.

In the display control apparatus for the splicing screen of the above embodiment, the acquisition unit, the adjustment unit, the calculation unit, and the transmission unit are all stored as program units in the memory, and the processor executes the program units stored in the memory to implement the corresponding functions.

The processor contains a kernel, and the kernel invoke corresponding program unit from the memory. The kernel can be provided one or more, and the control signal is sent by adjusting the kernel parameters, so that the splicing screen displays the image, and the images displayed on the display screens of the splicing screen match.

The above memory may include forms of a non-persistent memory, a random access memory (RAM) and/or a non-volatile memory in a computer readable medium, such as a read only memory (ROM) or a flash memory (flash RAM). The memory including at least one memory chip.

An embodiment of the present disclosure provides a storage medium including a stored program. When being executed, the program controls the device in which the storage medium is located to perform the display method for the splicing screen described above.

Wherein, the storage medium is a computer program product adapted to perform the display method for the splicing screen described above when executed on a data processing device.

Figure 9:
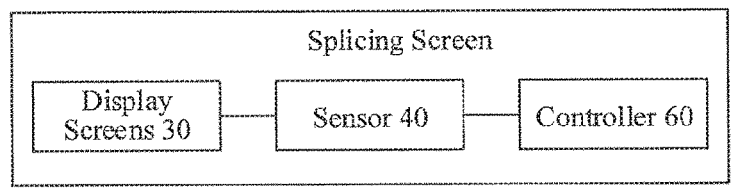
FIG. 9 is a schematic block diagram of a splicing screen according to an embodiment of the present disclosure.

As shown in FIG. 9, an embodiment of the present disclosure provides a splicing screen, including a plurality of display screens 30 spliced to one another, and further includes: the controller 60 described above; each of the display screens 30 includes a splicing edge, wherein the splicing edge is an edge of the display screen in contact with the display screen adjacent thereto. Referring FIG. 2, a sensor 40 is disposed on the splicing edge of each display screen 30, and the sensor 40 is configured to detect the position information of the display screen 30 and transmit the position information to the controller 60.

Wherein, the sensor is configured to detect the position information of the spliced display screens, and a contact position sensor may be used, or other sensors, such as a photoelectric sensor, may be configured to determine the position information from occluded light when the display screens are spliced together. The sensor in the prior art can detect the position information, which is not limited herein. To ensure detection accuracy, the sensor can be placed along the entire splicing edge of the display screen.

The controller can adopt an MCU or the like, and the functions of the controller and the display principle of the splicing screen are the same as those of the foregoing embodiment, details of which will not be described herein.

In the splicing screen provided by the embodiment of the present disclosure, physical coordinates of a plurality of display screens constituting the splicing screen are acquired, a length and a width of an image to be displayed is made to be equal to a length and a width of the virtual display screen obtained from the splicing, and a resolution of the image is acquired, such that pixel coordinates of each display screen are calculated respectively according to the physical coordinates of the plurality of display screens and the resolution of the image, and then pixel data is distributed to each display screen according to the pixel coordinates of each display screen, so as to achieve the splicing screen for displaying the image. For a splicing screen composed of display screens of different sizes, since the image displayed on the display screen is achieved by acquiring corresponding pixel data according to pixel coordinates of the display screens after the display screens are spliced, when displaying an image on the splicing screen, the parts of the image on the display screens are matched.

The splicing screen according to the present disclosure can be used as a complete display unit alone or in combination with other screens to form a super large screen. According to different needs in practical applications, the splicing screen of the present disclosure can realize single screen split display, single screen separate display, arbitrary screen combination display, all screen splicing display, vertical screen display, etc., and the border of the displayed image can be either compensated or covered. Thereby, the image can be expanded and displayed between screens of different screens, different sizes and different resolutions, thereby realizing expansion of the image to an arbitrary scale and in any dimension.

Through the description of the above embodiments, those skilled in the art will appreciate that embodiments of the present application can be provided as a method, a system, or a computer program product. Thus, the present application can take the form of an entirely hardware embodiment, an entirely software embodiment, or an embodiment in combination of software and hardware. Moreover, the application can take the form of a computer program product embodied on one or more computer-usable storage media (including but not limited to disk storage, a CD-ROM, an optical storage, etc.) including computer usable program codes.

The present application is described with reference to flowcharts and/or block diagrams of methods, devices (systems), and computer program products according to embodiments of the present application. It will be understood that each step and/or block of the flowchart and/or block diagram, and combination of the steps and/or blocks of the flowchart and/or block diagram can be implemented by computer program instructions. These computer program instructions can be provided to a processor of a general purpose computer, a special purpose computer, an embedded processor, or other programmable data processing device to produce a machine for implementing the function specified in one or more steps of the flowchart and/or one or more blocks of the block diagram.

The computer program instructions can also be stored in a computer readable memory that can direct a computer or other programmable data processing device to operate in a particular manner, such that the instructions stored in the computer readable memory produce an article of manufacture including an instruction apparatus. The instruction apparatus implements the functions specified in one or more steps of the flowchart and/or one or more blocks of the block diagram.

These computer program instructions can also be loaded onto a computer or other programmable data processing device such that a series of operational steps are performed on a computer or other programmable device to produce computer-implemented processing, for execution instructions on a computer or other programmable device to provide steps for implementing the functions specified in one or more steps of the flowchart and/or one or more blocks of the block diagram.

In a typical configuration, a computing device includes one or more processors s18 (CPUs), an input/output interface, a network interface, and a memory.

The memory may include a non-persistent memory, a random access memory (RAM), and/or a non-volatile memory in a computer readable medium, such as s read only memory (ROM) or a flash memory. The memory is an example of a computer readable medium.

A computer readable medium includes either persistent or non-persistent medium, removable or non-removable medium, and can realize information storage by any method or technology. The information can be computer readable instructions, data structures, modules of programs, or other data. Examples of computer storage medium include, but are not limited to, a phase change memory (PRAM), a static random access memory (SRAM), a dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, magnetic cartridge tape, magnetic tape storage or other magnetic storage devices or any other non-transportable media, which can be configured to store information that can be accessed by a computing device. As defined herein, a computer readable medium does not include transitory computer readable medium, such as modulated data signals and carrier waves.

The embodiments disclosed in the present disclosure are as described above, but are merely used to facilitate the understanding of the present disclosure, and are not intended to limit the present disclosure. Any modification or variation in the form and details of the implementation may be made by those skilled in the art without departing from the spirit and scope of the disclosure. The protection scope of the present disclosure is subject to the scope defined by the appended claims.

What is claimed is:

1. A display method for a splicing screen, comprising:
   acquiring physical coordinates of a plurality of display screens constituting a splicing screen;
   adjusting a size of an image to be displayed to be equal to a size of a virtual display screen after the plurality of display screens are spliced, and acquiring a resolution of the image;
   respectively calculating pixel coordinates of each of the display screens according to the physical coordinates of the plurality of display screens and the resolution of the image; and
   distributing pixel data to each of the display screens according to the pixel coordinates of each of the display screens,
   wherein acquiring physical coordinates of a plurality of display screens constituting a splicing screen comprises:
      acquiring splicing positions of the plurality of display screens constituting the splicing screen;
      acquiring a physical size of each of the display screens;
      defining a reference origin of the splicing screen; and
      calculating physical coordinates of each of the display screens relative to the reference origin according to the physical size of each of the display screens and the splicing positions of the plurality of display screens,
   wherein the reference origin of the splicing screen is defined as the lower left corner of the virtual display after the plurality of display screens are spliced; and
   wherein respectively calculating pixel coordinates of each of the display screens according to the physical coordinates of the plurality of display screens and the resolution of the image comprises:
      calculating the pixel coordinates of the display screen according to $$\left(\frac{x_1}{x_2} \cdot j, \frac{y_2 - y_1}{y_2} \cdot k\right),$$

where $(x_1, y_1)$ is the physical coordinates of the display screen, and $(x_2, y_2)$ is the physical coordinates of the upper right corner of the virtual display screen after the plurality of display screens are stitched, and j·k is the resolution of the image.

2. The display method for a splicing screen according to claim 1, wherein calculating physical coordinates of each of the display screens relative to the reference origin according to the physical size of each of the display screens and the splicing positions of the plurality of display screens comprises:
   calculating physical coordinates of any set of diagonal points in each of the display screens relative to the reference origin according to the physical size of each of the display screens and the splicing positions of the plurality of display screens.

3. The display method for a splicing screen according to claim 2, wherein respectively calculating pixel coordinates of each of the display screens according to the physical coordinates of the plurality of display screens and the resolution of the image comprises:
   respectively calculating pixel coordinates of one of the diagonal points in each of the display screens according to the physical coordinates of the diagonal points in the plurality of display screens with respect to the physical coordinates of the reference origin and the resolution of the image.

4. The display method for a splicing screen according to claim 3, wherein distributing pixel data to each of the display screens according to the pixel coordinates of each of the display screens comprises:
   acquiring a size of a pixel area of each of the display screens; and
   distributing pixel data to each of the display screens according to the pixel coordinates of one of the diagonal points in each of the display screens and the size of the pixel area.

5. The display method for a splicing screen according to claim 1, wherein distributing pixel data to each of the display screens according to pixel coordinates of each of the display screens comprises:
   when there is a screen vacant part in an effective display area of the splicing screen compared to the virtual display screen, not transmitting pixel data corresponding to the vacant part.

6. The display method for a splicing screen according to claim 1, further comprising:

determining a display parameter of each of the display screens, wherein acquiring a resolution of the image comprises: acquiring a resolution of the image based on the display parameter of each of the display screens and the size of the virtual display screen.

7. The display method for a splicing screen according to claim 1, further comprising:
transmitting a synchronization signal to each of the display screens before distributing pixel data to each of the display screens according to pixel coordinates of each of the display screens.

8. A display control apparatus for a splicing screen, comprising:
an acquiring unit configured to acquire physical coordinates of a plurality of display screens constituting a splicing screen;
an adjusting unit configured to adjust a size of an image to be displayed to be equal to a size of a virtual display screen after the plurality of display screens are spliced, and acquire a resolution of the image;
a calculating unit configured to respectively calculate pixel coordinates of each of the display screens according to the physical coordinates of the plurality of display screens acquired by the acquiring unit and the resolution of the image acquired by the acquiring unit; and
a transmitting unit configured to distribute pixel data to each of the display screens according to the pixel coordinates of each of the display screens acquired by the calculating unit,
wherein the acquiring unit comprises:
a first acquiring module configured to acquire splicing positions of the plurality of display screens constituting the splicing screen;
a second acquiring module configured to acquire a physical size of each of the display screens;
a coordinate module configured to define a reference origin of the splicing screen;
a first calculating module configured to calculate physical coordinates of each of the display screens relative to the reference origin according to the physical size of each of the display screens acquired by the second acquiring module and the splicing positions of the plurality of display screens acquired by the first acquiring module,
wherein the coordinate module is configured to define the reference origin of the splicing screen as the lower left corner of the virtual display after the plurality of display screens are spliced; and
wherein the calculating unit is configured to calculate the pixel coordinates of the display screen according to $$\left(\frac{x_1}{x_2} \cdot j, \frac{y_2 - y_1}{y_2} \cdot k\right),$$

where $(x_1, y_1)$ is the physical coordinates of the display screen, and $(x_2, y_2)$ is the physical coordinates of the upper right corner of the virtual display screen after the plurality of display screens are stitched, and j·k is the resolution of the image.

9. The display control apparatus for a splicing screen according to claim 8, wherein the first calculating module is configured to calculate physical coordinates of any set of diagonal points in each of the display screens relative to the reference origin according to the physical size of each of the display screens and the splicing positions of the plurality of display screens.

10. The display control apparatus for a splicing screen according to claim 8, wherein the calculating unit is configured to respectively calculate pixel coordinates of one of the diagonal points in each of the display screens according to the physical coordinates of the diagonal points in the plurality of display screens with respect to the physical coordinates of the reference origin and the resolution of the image.

11. The display control apparatus for a splicing screen according to claim 10, wherein the transmitting unit comprises:
a third acquiring module configured to acquire a size of a pixel area of each of the display screens; and
a transmitting module configured to distribute pixel data to each of the display screens according to the pixel coordinates of one of the diagonal points in each of the display screens and the size of the pixel area.

12. The display control apparatus for the splicing screen according to claim 8, wherein the transmitting unit is further configured to:
when there is a screen vacant part in an effective display area of the splicing screen compared to the virtual display screen, not to transmit pixel data corresponding to the vacant part.

13. The display control apparatus for a splicing screen according to claim 12, wherein:
the acquiring unit is further configured to determine a display parameter of each of the display screens; and
the adjusting unit is further configured to acquire a resolution of the image based on the display parameter of each of the display screens and the size of the virtual display screen.

14. A controller, comprising a memory and at least one processor coupled to the processor, wherein the processor is configured to execute program instructions stored in the memory, when being executed, the program instructions perform the display method for a splicing screen according to claim 1.

15. A storage medium, wherein the storage medium comprises a stored program, wherein when being executed, the program controls the device in which the storage medium is located is controlled to perform the display method for a splicing screen according to claim 1.

16. A splicing screen comprising a plurality of display screens spliced to one another, further comprising the controller according to claim 8, wherein:
each of the display screens comprises a splicing edge, the splicing edge being an edge of the display screen in contact with the display screen adjacent thereto; and
the splicing edge of each of the display screens is disposed with a sensor, the sensor being configured to detect position information of the display screen and transmit the position information to the controller.

* * * * *